(12) United States Patent
Vajjhala

(10) Patent No.: US 8,392,349 B2
(45) Date of Patent: Mar. 5, 2013

(54) GLOBAL ADAPTATION ATLAS AND METHOD OF CREATING SAME

(75) Inventor: Shalini Vajjhala, Washington, DC (US)

(73) Assignee: Shalini Vajjhala, Washington, DC (US)

( * ) Notice: Subject to any disclaimer, the term of this patent is extended or adjusted under 35 U.S.C. 154(b) by 376 days.

(21) Appl. No.: 12/710,498

(22) Filed: Feb. 23, 2010

(65) Prior Publication Data

US 2010/0217739 A1    Aug. 26, 2010

Related U.S. Application Data

(60) Provisional application No. 61/154,453, filed on Feb. 23, 2009.

(51) Int. Cl.
*G06N 5/02*     (2006.01)
*G06F 17/30*    (2006.01)
*G06F 17/40*    (2006.01)

(52) U.S. Cl. ............................ 706/47; 706/50

(58) Field of Classification Search ................... 706/47
See application file for complete search history.

(56) References Cited

U.S. PATENT DOCUMENTS 5,652,717 A * 7/1997 Miller et al. ............... 703/6

* cited by examiner

*Primary Examiner* — Jeffrey A Gaffin
*Assistant Examiner* — Nathan Brown, Jr.
(74) *Attorney, Agent, or Firm* — The Law Office of Michael E. Kondoudis

(57) ABSTRACT

A method and system that provides an "atlas" on global adaptation providing mapping, analysis, and reporting for scientists and decision-makers, of the best-available science on climate impacts and up-to-date information on adaptation projects. The atlas may be web-based. A method of displaying climate change data includes: collecting existing climate data; consolidating the collected data by designed attribute categories; filtering the collected data by attribute(s); presenting climate data to a user based on selected attribute categories; and archiving climate data.

9 Claims, 4 Drawing Sheets

GLOBAL ADAPTATION ATLAS AND METHOD OF CREATING SAME

CROSS-REFERENCE TO RELATED APPLICATION

This application claims the benefit of priority from U.S. Provisional Patent Application No. 61/154,453, filed Feb. 23, 2009, which is incorporated by reference in its entirety.

BACKGROUND

1. Field

Embodiments of the present invention relate generally to global climate impact modeling and mapping and a global climate change adaptation atlas.

2. Description of Related Art

The Earth's climate has changed many times during the planet's history, with events ranging from ice ages to long periods of warmth. Historically, natural factors such as volcanic eruptions, changes in the Earth's orbit, and the amount of energy released from the Sun have been shown to affect the Earth's climate. Also, human activities associated with the Industrial Revolution beginning late in the 18th century have changed the composition of the Earth's atmosphere and are projected to further influence the Earth's climate in various ways.

The extent of climate change impacts upon different ecosystems, regions and sectors of the economy depend not only on the severity and certainty of specific changes, but also on the sensitivity of those systems to climate change and these systems' ability to adapt to climate change and to reduce the negative impacts of such changes on human activities and ecosystem functions.

Climate mitigation is any action taken to limit the emissions of greenhouse gases to the atmosphere to reduce the potential long-term risk and hazards of climate change. Examples of mitigation include taking actions to reduce greenhouse gas emissions from electric power plants, vehicles, and land management practices. Mitigation is a global issue, where emissions reductions anywhere provide benefits everywhere.

Climate adaptation is the process of adjusting to changing environmental conditions that will likely occur even with emissions mitigation efforts. Adaptive practices and outcomes encompass a broad set of activities designed to reduce human and ecosystem vulnerability to climate change. Because climate impacts are spatially diverse and could affect exposed populations and resources around the world very differently, adaptation is an inherently location-specific problem and thus must be targeted and site-specific to be effective. As a result, the geographic location of key impacts, populations, and resources—where, whom, and how hard droughts, storms, or floods will hit—are central to decision making and investment.

Adaptive interventions can range in scale and scope from small installations such as rainwater collection and drip irrigation systems to national investments in dikes and levees to respond to sea level rise.

Adaptation to environmental change is not a new concept. Human societies have shown throughout history a strong capacity for adapting to different climates and environmental changes. For example, farmers, foresters, civil engineers, and their supporting institutions have been forced to adapt to numerous challenges to overcome adversity or to remove important impediments to sustained productivity. An example of an adaptation strategy to prevent damage from climate change is shore protection (e.g., dikes, bulkheads, beach nourishment), which can prevent sea level rise from inundating low-lying coastal property, eroding beaches, or worsen flooding. If the costs or environmental impacts of shore protection are high compared with the property being protected, an alternative adaptation strategy would be a planned retreat, in which structures are relocated inland as shores retreat. Other examples of adaptation and coping strategies with current climate fluctuations include farmers planting different crops at different times of a season, and wildlife migrating to more suitable habitats as the seasons change.

Until recently, interventions like those discussed above were seen as either poverty alleviation development activities or solely as backstop measures in the event that mitigation efforts failed. Now there is growing recognition that reducing vulnerability and building resilience to climate impacts are complementary-not competing-objectives. Despite this shift in awareness, adaptation remains a daunting challenge, requiring coordination at unprecedented scales from the local to global level across nearly all sectors of the economy and all types of ecosystems. In many cases, the countries and regions in greatest need of adaptation measures are the least equipped to develop, manage, and coordinate large-scale programs.

Adaptation to climate change is emerging as a significant policy issue, and a variety of efforts are being advanced to help build resilience to climate impacts around the world. Although new funding mechanisms, such as the UN Adaptation Fund, are expected to allocate hundreds of millions of dollars to the problem in the coming decade, there is a growing disconnect between science and policy, and the local impacts of climate change on our food, water, land, health, and livelihood systems are still poorly understood.

The global community is now slowly converging around international and national policy options for mitigation, and in parallel, a variety of large and small-scale funding mechanisms have emerged to spur investment in adaptation. However, the allocation of adaptation funding remains highly controversial, and limited lessons can be drawn from the decades of experience with mitigation policy design that are relevant for adaptation policy and investment. The primary reason for this disconnect is a single fundamental difference between the problems of mitigation and adaptation: location.

Adaptation policy design is a fundamentally spatial problem. Thus, adaptation mapping is a critical prerequisite to decision making, investment, and policy design at multiple scales from the local to the international. The geographic locations of populations, resources, and impacts are central to the decisions being made. Geography is one of the few common threads connecting the science on climate impacts to programs and policies designed to promote adaptation. Therefore, mapping can play a central role in building and maintaining the essential linkages between science, policy, and on-the-ground practice. Because adaptation is both a global and a local problem affecting populations and ecosystems around the world, it is natural that responses will be sector-, site-, and population-specific. Therefore, success depends on real-time coordination of impacts and adaptation activities intended to respond to those impacts.

Science and policy coordination is an essential element of effective adaptation. Without coordination, adaptation programs have the potential to duplicate or undermine one another. For example, rainwater collection projects in warming regions could increase the risk of mosquito breeding and undercut parallel malaria prevention efforts.

Current global climate models are not well suited to evaluate highly localized impacts or adaptation needs. Global assessments have typically been focused on macro-scale trends in natural systems, such as changes in global average temperature or precipitation, making it extremely challenging to assess local climate impacts, especially in developing nations, where there are large gaps in monitoring and baseline research.

The existing body of climate science on human system impacts is very coarse and limited. Scientists around the world, however, are making strides in creating finer-grained regional and local assessments of impacts and integrating these data across multiple sectors ranging from health to water.

Nonetheless, decision-makers at all levels of government have already begun to establish funding mechanisms for adaptation. The largest and most recent of these is the UNFCCC Adaptation Fund. It already holds approximately $50 million dollars (USD), a figure that is expected to grow into the billions over the coming decades. Yet significant disagreement exists about how to set allocation priorities and identify target areas for new investment.

This conflict is not unique: governments, donors, and development practitioners at all levels around the world are making similar decisions about how to address and prioritize climate change within ongoing projects and programs. To date, all of these efforts have largely been driven by current political concerns in the absence of a clear picture of future impacts. Without careful coordination, there is a risk of investing in adaptation measures in one sector that could duplicate or negate investments in another sector both in the short-term and the long-term. For example, new rainwater collection reservoirs in areas affected by climate change could create large pools of standing water in areas more susceptible to breeding of mosquitoes, which in turn could undercut public health interventions targeting outbreaks of malaria or dengue fever, by changing local exposure to mosquito-borne diseases. As a result, stakeholders not only require information on how the local climate is anticipated to change, but also information on what others in the region and around the world are doing in response. Right now, no central clearinghouse exists for this kind of data.

It would therefore be advantageous to compile and map climate impact and adaptation project data to define priorities for adaptation funding and early capacity building efforts, and to strengthen the links between science, policy, and practice.

DETAILED DESCRIPTION

Figure 1:
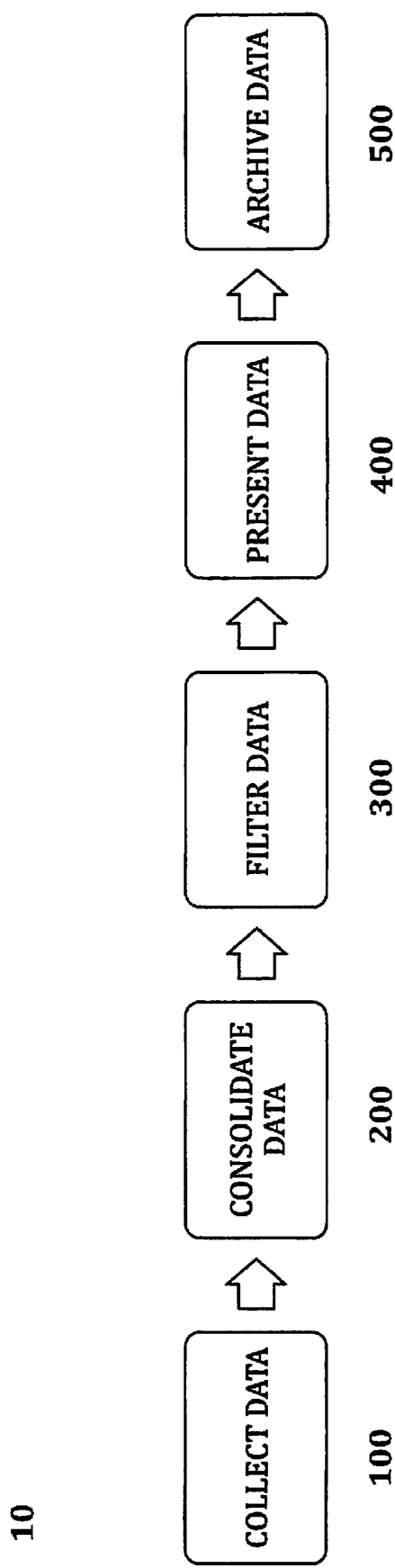
FIG. 1 is a flowchart illustrating a method of constructing and displaying impact and adaptation activity map layers in a global climate change atlas according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

The inventors have invented an "Adaptation Atlas" or "atlas" on global adaptation, which is an organizing framework for consolidating diverse maps, map layers, and spatial data, representing the best-available science on impacts and up-to-date information on adaptation projects.

The atlas may be a web-based mapping and reporting application that dynamically and interactively integrates maps of the best-available science on climate impacts and up-to-date information on adaptation projects. For example, the atlas may be constructed to provide a Google Earth like interface to enable a platform on which users can contribute, search, query, and view, regional climate impacts, adaptation science, and associated project information in a quality-controlled wiki format. The real-time data displayed online would allow diverse users from scientists and policymakers, to layman and local decision makers, to visualize various climate change related parameters such as, by way of non-limiting examples:

What climate impacts are likely to affect their region(s)?
What adaptation activities are already underway? What activities are planned?
What gaps exist?
Where various ongoing efforts might undercut one another?
Where are the most important locations and sectors to act?

Such a web-based application permits users to interact with a unique consolidated geographically indexed database of climate impact data and adaptation projects, to graphically report on the projected impacts of climate change for different regions, time scales (i.e.; 10, 20, or n years into the future), scenarios, and models across the following five exemplary impact themes:

Food (i.e.; Change in Agricultural productivity);
Water (i.e.; Changes in quantity and quality of surface and groundwater);
Land (i.e.; Loss of land due to 1 m of sea level rise);
Health (i.e.; Change in probability of dengue fever epidemic); and
Livelihood (i.e.; Impacts on number of tourism days).

Referring now to FIG. 1, there is illustrated a method of constructing an atlas consistent with an embodiment of the present invention. The method 10 includes the following five operations: collecting climate data (operation 100); consolidating the collected data (operation 200); filtering collected impact data (operation 300); presenting climate data to a user (operation 400) and archiving climate data (operation 500).

Operation 100, the collecting and compiling of climate data, includes the collection of two main types of data. The first type of data is climate impact science data, which results from the climate modeling and observational studies of how changes in climate, natural resource, and human socio-economic systems affect each other. In essence, this type of data relates to the direct and indirect human impact(s) of climate change. An example of such data is a map of projected change in agricultural production due to a specified climate variation. The second type of data is adaptation project data, which results from the observation and tracking of man-made projects and investments directed to adaptation. An example of this type of data is records of the location, size, type, and service area of a rainwater collection project. Additionally and/or alternatively, other types of data may be collected, including by way of non-limiting examples, user information and user profiles.

The data may be collected in one or more of the following modes. A first mode may be to "pull" data from existing systems from data providers. A second mode may be for existing data providers to "push" data. A third mode may be to upload data from non-partners (i.e., independent third-party sources). These modes may be realized through various known methods. Collected information using all three modes would include map layers on climate impacts and spatial information on adaptation activities intended to manage and reduce these impacts at various scales—from the community level to the multi-national level.

This collected data would then be organized to allow users to filter, sort, select, and overlay compatible map layers of climate impacts and adaptation projects to illustrate hotspots of impact and (in)action, as will be described in detail below.

It is contemplated that the collection process may be automated by using an online survey mechanism, for example. In such an online mechanism, impact and project data to be entered into the atlas will first be solicited from specific groups of users, such as scientists, foundation program officers, and development agency staff, to form a broad, searchable database of impact map layers adaptation activities over time. Atlas entries would be regularly (periodically) updated and solicited using a carefully designed and deployed online survey inviting development practitioners, donors, and program managers to enter descriptive information about their relevant past projects and ongoing programs such as, by way of non-limiting examples, sector, size, location, population served, funding source, and project timeline.

As adaptation activities proliferate and cover ever-wider sets of activities from basic research, institutional capacity building, and development planning to climate-proofing infrastructure to designing new insurance mechanisms at different scales, tracking adaptation efforts will become increasingly challenging. Through this rigorously reviewed spatial approach to collecting adaptation data, the hurdle of conducting repeated and fragmented paper surveys and assessments is overcome. Also, the atlas will be more powerful because it will be based on an ongoing real-time data uploads and a dynamic online archive of adaptation projects around the globe that can be filtered and sorted in order to analyze patterns of adaptation investment over time and evaluate their relationships to expected climate impacts at different scales.

In the collecting data operation, peer-reviewed data is prioritized and tagged with identifiers; as such data is inherently more trustworthy than data that has not been peer-reviewed.

Figure 2:
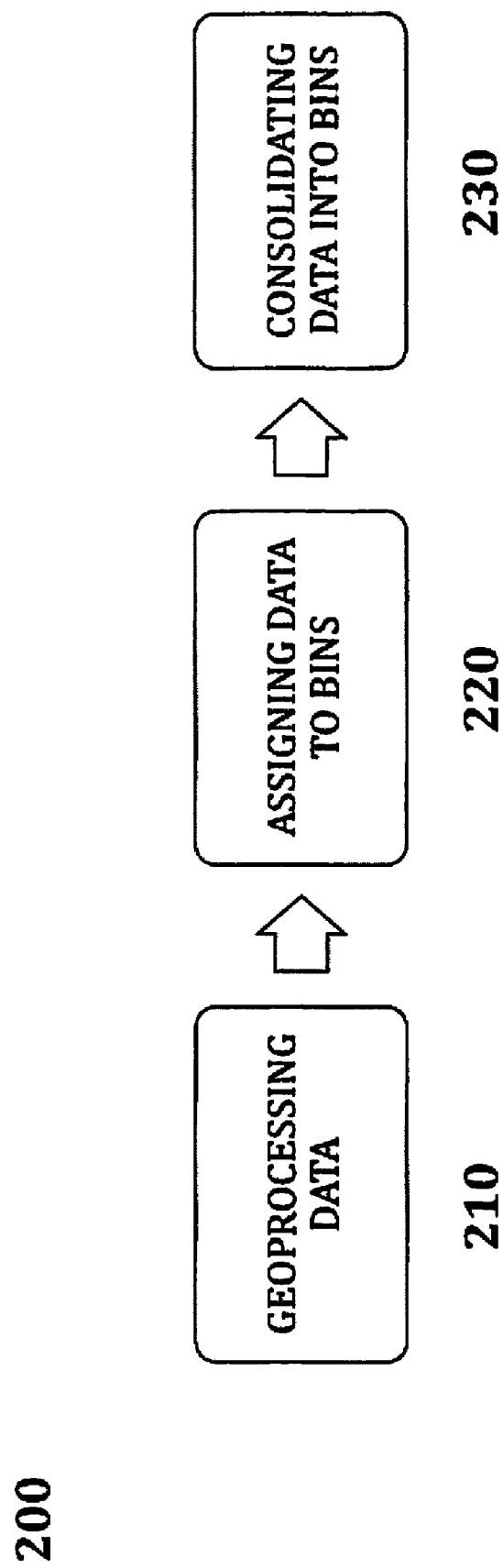
FIG. 2 is flowchart illustrating operation 200 of FIG. 1 in detail.

Referring now to FIG. 2, there consolidating operation 200 is illustrated in more detail. Operation 200 includes the following three operations: geoprocessing of collected data (operation 210); assigning the processed data to various bins (operation 220); and consolidating data into the assigned bins (operation 230).

The raw data collected in operation 100 is typically of many different and potentially incompatible formats. For example, maps and charts, which may include highly accurate climate data for mutually exclusive climate scenarios, present data that are in inherently incompatible. A necessary prerequisite to consolidating this data, is to code and normalize (standardize) it to avoid layering and counting such incompatible impacts. Geoprocessing (in operation 210) is the process by which the incompatible data is organized for easier processing, viewing, and use.

Geoprocessing is based on a framework of data transformation and is a geographic information system (GIS) operation used to manipulate data. A typical geoprocessing operation takes an input dataset, performs an operation on that dataset, and returns the result of the operation as an output dataset. Common geoprocessing operations include geographic feature overlay, feature selection and analysis, topology processing, raster processing, and data conversion. Geoprocessing allows for definition, management, and analysis of information used to form decisions by harmonizing such data for display in compatible projections and symbologies.

A typical geoprocessing tool performs an operation on an ArcGIS dataset (such as a feature class, raster, or table) and produces a new dataset as the result of the tool. Each geoprocessing tool performs a small yet essential operation on geographic data, such as projecting a dataset from one map projection to another, adding a field to a table, or creating a buffer zone around features. ArcGIS includes hundreds of such geoprocessing tools.

Figure 3:
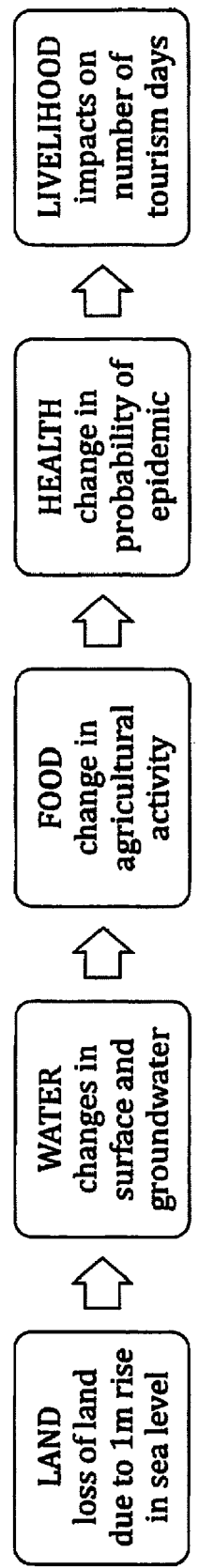
FIG. 3 is a illustration of a thematic bin set.

In operation 220, the normalized data is categorized or organized for use by the atlas. This is accomplished by assigning the data to key files or "bins". Non-limiting examples of bins may include land and water. These key files or "bins" may be grouped into sets. It is contemplated that various sets of bins may be used including, by way of non-limiting examples, geographical, sectoral, size, and source (e.g., whether data has been peer reviewed). An example of a set of thematic bins is illustrated in FIG. 3.

In operation 230, after the data has been normalized in operation 210 and assigned to various bins in operation 220, the data is consolidated into the assigned bins. During this process, the data are assigned codes or weights corresponding to various attributes, such as level of peer review, a measure of trustworthiness. Not all data collected for use by the atlas will be of the same usefulness. Rather, more trustworthy data will be more useful. Thus, some data will be entitled to more "weight" while others will be entitled to less weight.

One measure of data trustworthiness is the number of times they have been cited in academic literature. Accordingly, one contemplated mode of weighting assigned data is to use a web tool such as "GOOGLE SCHOLAR" to determine the number of times particular data have been cited. The total number of citations would then be linked to associated data layers in the atlas to provide users with options to sort and view compatible data layers by automatically updatable characteristics such as the most cited, most recent, most popular, etc.

Figure 4:
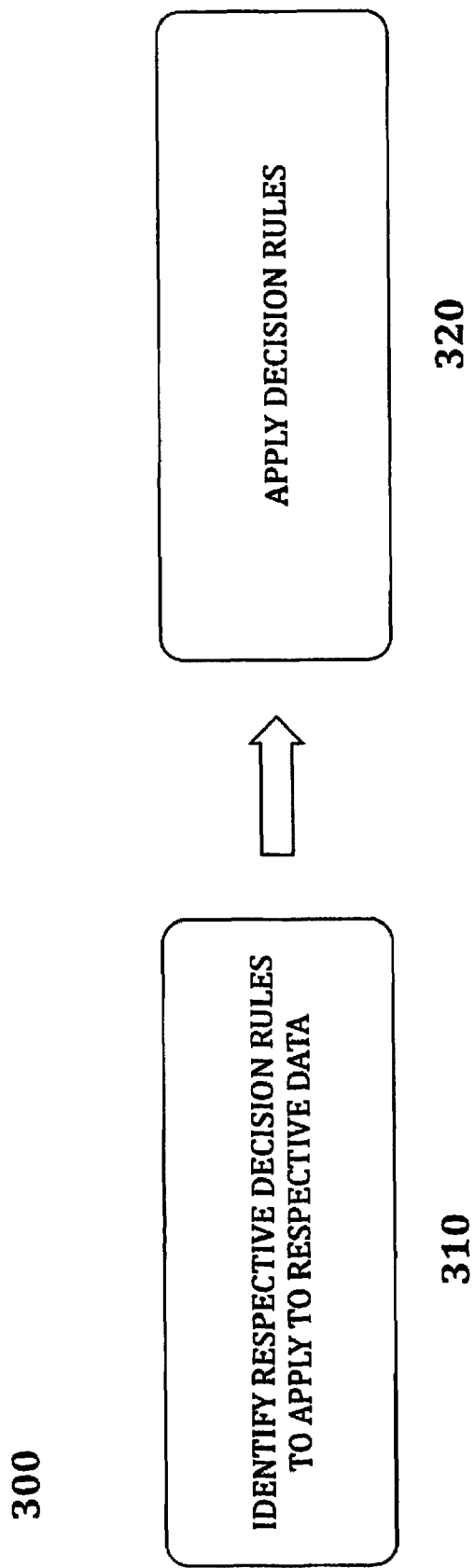
FIG. 4 is a flowchart illustrating operation 300 of FIG. 1 in detail.

Referring now to FIG. 4, there the data filtering operation of FIG. 1 (operation 300) is illustrated in more detail. Operation 300 includes the following component operations: identifying respective decision rules to apply to respective data (operation 310); and applying the identified decision rules to the data (operation 320).

The filtering operation determines data compatibility of impact science data. Within any given bin there may be climate impact data that should not be presented in aggregate. At the same time, there may be data that can and should be presented in aggregate. An example might be climate impact data for a world population of 4,000,000,000 verses a world population of 9,000,000,000. These scenarios are mutually exclusive. Consequently, the data associated with these two respective scenarios are not compatible. Further, in any given set of bins, there may be data in various ones of the bins that may be aggregated and other data that cannot.

Aggregating data without determining data compatibility can lead to incompatible assumptions and scenarios, which in turn lead to incorrect conclusions that result in least less effective and/or efficient decisions.

The compatibility of climate impact data in a particular bin and/or set of bins is governed by decision rules. For example, a decision rule might be that user may not be permitted to view in aggregate impact data for incompatible scenarios. This would prevent a user from overlaying incompatible data on the atlas. Incompatible data layers could display the results of different time frames, counter-factual scenarios, or competing assumptions. Examples include flood data for the year 2050 and the year 2080, which represent mutually exclusive projections of the same climate impact. In contrast, data compatible for overlay could include layers of different climate impacts on water, such as flood, drought, and contamination, which share a common scenario, year, region and time frame. With rules for organizing such information based on compatibility with the first/current selected map layer or defined input parameters (e.g. Africa, 2080, +3 degrees C., etc.), long-term monitoring, evaluation, and priority setting through the development of a spatial data archive may be maintained.

Referring back to FIG. 1, the data collected in operation 200 is available for display after operation 300. One contemplated mode of displaying the data is to overlay selected data on an appropriate map.

In the overlaying operation, the harmonized data sets are overlayed onto maps so that overlaps of multiple impacts are illustrated. These overlapped areas where impacts intersect are called hotspots. Hotspots are areas where multiple impacts are likely to occur and, if they occur, could have a cumulative effect. This overlaying may be realized with online software.

It is contemplated that this approach can be extended to bring together multiple studies at different scales and dynamically update the atlas with data from higher-resolution regional models, creating a patchwork quilt of the best-available climate science around the globe, as forecasts improve.

The process of conducting online surveys to facilitate the upload and entry of information about adaptation activities opens the door to the third component of the atlas: outreach and dissemination. A major feature will be real-time outputs tailored to each entry/user on related local and regional efforts and relevant global best practices for similar types and sizes of projects. A user who enters information (or searches for projects) on micro-insurance programs for small farmers in Mali would be able to view collections of information on projects in the same sector within the same local coverage area in Mali, projects in different sectors (water, health, etc.) in Mali or across West Africa, and projects of similar type and size across the world.

It is contemplated that existing software, such as, by way of a non-limiting example, Google Earth, is usable as a platform on which to layer relevant demographic and natural resource data, just as it is now possible to cue up an existing map and add terrain and satellite information. The real-time information displayed online would allow decision-makers ranging from the leader of a small farming cooperative to the international donor to visualize what impacts are likely to affect their region(s), what activities are already underway, and what gaps need to be filled with new adaptation activities and measures.

Additionally and/or alternatively, method 10 may include an optional archive operation (500) to store the collected data.

Consistent with an embodiment of the present invention, the method of FIG. 1 may be executed by a system. The invention may also be embodied in a general purpose digital computer that is running a program or program segments originating from a computer readable or usable medium, such medium including but not limited to magnetic storage media (e.g., ROM's, floppy disks, hard disks, etc.) and optically readable media (e.g., CD-ROMs, DVDs, etc.). A functional program, code and code segments, used to implement the present invention can be derived by a skilled computer programmer from the description of the invention contained herein.

As described above, the atlas aggregates and displays, at a high level of detail, the locations of specific adaptation projects and the areas they are intended to serve.

Also evident from the foregoing, the atlas establishes a platform for monitoring and evaluation. By creating a spatial data archive, the atlas will support visualization and analysis of areas around the world where data (science) on climate impacts is inadequate, policy action is lacking across regions and sectors, and adaptation-related decisions and activities have the potential to duplicate or negate one another in the absence of coordination.

Further, because it will be made publicly available, this archive also has the potential to support monitoring and assessment activities for local adaptation projects and policies. In addition, the database can be used to help monitor large-scale adaptation funds controlled by international bodies, national government, the philanthropic community, and the private sector in concert with one another. Monitoring, assessment, and evaluation are critical challenges when it comes to adaptation. The eventual goal of any adaptation measure is to prevent adverse impacts from climate change. As a result, defining and measuring success will depend on having a clear baseline to be able to effectively evaluate both progress and delays.

So, for example, a foundation program officer in Mali working on supporting innovative irrigation systems for agriculture and a local health official concerned about the spread of dengue in the same area would both be able to view the potential impacts of climate change on agricultural productivity and disease spread in the country and across a wider region of West Africa. The public health specialist could address risks of mosquito breeding created by new irrigation ponds or channels and compare locations of new disease vectors against the existing. Similarly, local agriculture extension agents funded by government ministries could be provided with health information in tandem with education materials on water and irrigation to distribute to individual farmers. All would receive tailored feedback from the atlas on local, regional and global best practices for similar types of projects and relevant parallel efforts.

At a larger scale, for example, foundation program officers at the Gates Foundation, international agency staff at the WHO, and Adaptation Fund staff at the Global Environment Facility (GEF) could search and sort projects to view their own and other current grants in a sector or geographic area to identify opportunities for coordination, anticipate unintended consequences of existing projects, and set priorities for new programs and investments.

Since the atlas takes a collection of thousands of points and areas plotted alongside one another across the world and allow users to see gaps and overlaps in the types, sizes, and locations of projects relative to key climate impacts, the atlas aggregates climate science data and adaptation project data and display the same in a useful shared map format.

Also, since the atlas dynamically links the best available climate science with data on adaptation activities on the ground to highlight "hotspots of impact and inaction", the atlas helps decision makers set priorities for funding allocations at the global, national, and local levels. For example, a structured and tailored approach will allow advisory board members, atlas users, and practitioners to rate projects in a large, searchable database for best practices and lessons offered. Because adaptation is both a process and an outcome, capacity building is a fundamental component of promoting successful adaptation. This approach to outreach and education can help build awareness and shape early adaptation measures. The atlas can further lay the groundwork for scaling-up best practices under different contexts, governance structures, and institutions.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A method of displaying climate change data, comprising:
    collecting existing climate data;
    consolidating the collected data by designed attribute categories;
    filtering the collected data by attribute(s);
    presenting climate data to a user based on selected attribute categories; and
    archiving climate data;
    wherein the climate data includes climate impact science data and adaptation project data, and
    wherein the one type of filtered data is impact science data.

2. The method of claim 1, wherein the collecting climate data includes collecting the data by pulling data from existing systems from data providers, receiving pushed data from the data providers and/or uploading data from independent third-party sources.

3. The method of claim 1, wherein, in the collecting existing climate data, data is collected from models, studies, research, or practice.

4. The method of claim 1, wherein the collecting climate data operation is executed periodically.

5. The method of claim 1, wherein filtering includes:
    identifying respective decision rules to apply to respective data; and
    applying the identified decision rules to the data.

6. A computer-readable storage medium encoded with processing instructions that cause a processor to execute the method of claim 1.

7. A method of displaying climate change data, comprising:
    collecting existing climate data;
    consolidating the collected data by designed attribute categories;
    filtering the collected data by attribute(s);
    presenting climate data to a user based on selected attribute categories; and
    archiving climate data;
    wherein the climate data includes climate impact science data and adaptation project data, and wherein the one type of filtered data is impact science data, and
    wherein the consolidating includes:
        geoprocessing of collected data;
        assigning the processed data to various bins; and
        consolidating data into the assigned bins.

8. The method of claim 7, wherein the various bins are grouped into one or more sets.

9. The method of claim 8, wherein at least one set includes geographical, sectoral, size, or source indicia.

* * * * *